Dec. 22, 1970 JAMES E. WEBB 3,550,023

ADMINISTRATOR OF THE NATIONAL AERONAUTICS AND SPACE ADMINISTRATION

REMODULATOR FILTER

Filed April 24, 1968

INVENTOR.

HOWARD C. VIVIAN

BY

ATTORNEYS 3,550,023
Patented Dec. 22, 1970

3,550,023

REMODULATOR FILTER

James E. Webb, Administrator of the National Aeronautics and Space Administration, with respect to an invention of Howard C. Vivian, La Canada, Calif.

Filed Apr. 24, 1968, Ser. No. 723,804
Int. Cl. H03b *1/04*
U.S. Cl. 328—165 2 Claims

ABSTRACT OF THE DISCLOSURE

An apparatus is disclosed for filtering an input signal to obtain the components of a particular frequency and phase. The apparatus comprises a pair of capacitors, each having a first side coupled directly to the output and coupled through a common resistor to the input. The apparatus also includes a switch which alternately connects the second side of each capacitor to ground to enable the capacitors to alternately charge toward the input signal level during alternate half cycles of the switch frequency.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

(1) Field of the invention

This invention relates to filtering circuits.

(2) Description of the prior art

Many information processing systems require narrow band filtering to limit noise, reject spurious signals or shape the information signal response. Typical filters for these purposes include LC networks, twin-T or parallel-T networks, and phase-locked-loop apparatus. Generally, the use of these filters results in the decrease of an important system performance factor, such as gain, stability, or Q factor.

One method which enables narrow band filtering is disclosed in Pat. 2,909,656, issued Oct. 20, 1959, to M. A. Meyer. It involves the demodulation of the input signal, the filtering of the demodulated signal, and the remodulation of the signal, to obtain or exclude only those components of the original signal of a particular frequency. However, the apparatus required for such processing is at least moderately complex and expensive due to the complexity of the modulating and demodulating processes. Apparatus which simplified these processes would allow this method to be more widely utilized.

In some filtering applications, it is necessary to exclude not only those signal components which differ in frequency from a reference signal, but also those components which differ in phase. For example, in servo and related systems it is important to remove not only the undesired harmonic content from the error signal, but also quadrature components, to avoid saturation and excessive dissipation in other system apparatus. A method for doing this is disclosed in Pat. 3,085,166, issued Apr. 9, 1963, to J. K. Gogia and J. C. Guyeska. It involves demodulating the input signal, filtering the demodulated signal, and remodulating the filtered signal, to obtain only those components of the input signal which are of use in the system. A simpler apparatus which combined the three functions of demodulation, filtering and remodulation in a single circuit would lower the cost and complexity and permit this method to be more widely used.

OBJECTS AND SUMMARY OF THE INVENTION

One object of the present invention is to provide a synchronous filter capable of operation within a wide band of frequencies including very low frequencies, and which is extremely simple and economical to produce.

Another object is to provide a circuit for performing demodulating, filtering, and remodulating on an input signal to eliminate spurious signal components, which is of very high performance yet of extreme simplicity.

In accordance with the present invention, a narrow band synchronous filtering circuit is provided which comprises a pair of capacitors, each having a first terminal connected to the circuit input through a resistor. The output of the circuit is taken directly from the first capacitor terminals. The circuit includes a switch for alternately connecting the second terminals of the capacitors to ground. The switch is operated at the passband frequency.

The alternate grounding of the capaictors at each half cycle allows one capacitor to charge to the positive excursions of the input while the other charges to the negative excursions of the input, for input components of the passband frequency and which are in phase with the alternations of the switch. Components of other frequencies sometimes add and sometimes subtract from the capacitor charge, while components out of phase by 90° add and subtract the same amount every half-cycle. The net effect of such other components over a period of many cycles is substantially zero.

In certain applications, such as certain servomechanism systems, the frequency and phase of the signal component which it is desired to pass through the filter are known (but not its amplitude). In such cases, the switch can be operated in exact phase relationship to the input signal to be passed, and the output of the simple, two-capacitor filter can be used directly. In other applications, the phase of those input signal components which are of passband frequency is not known. In these applications, two of such two-capacitor circuits are required whose switches operate 90° out of phase with each other. The outputs of the two circuits are added and filtered to eliminate any effects due to the switches being out of phase with the input component of passband frequency.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
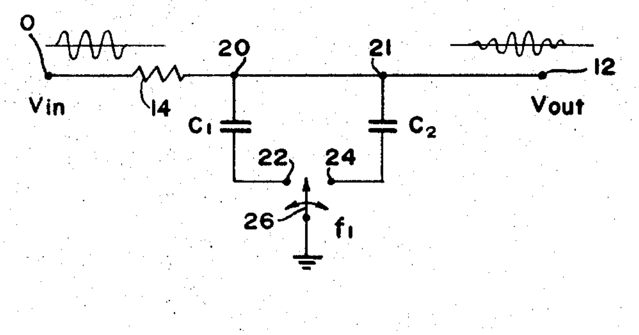
FIG. 1 is a simplified circuit diagram of a filtering apparatus constructed in accordance with the invention.

FIG. 1 is a simplified circuit diagram of a filtering apparatus in accordance with the invention comprising an input terminal 10, an output terminal 12, and a resistance 14 connecting them. The circuit includes a first capacitor $C_1$ and a second capacitor $C_2$, each having one terminal 20, 21 connected to the output 12 and another terminal 22, 24. A switch 26 alternately connects one of the capacitor terminals 22 or 24 to a reference potential such as ground. The switch 26 is operated at a frequency $f_1$ which is equal to the center frequency of the filter.

Figure 2:
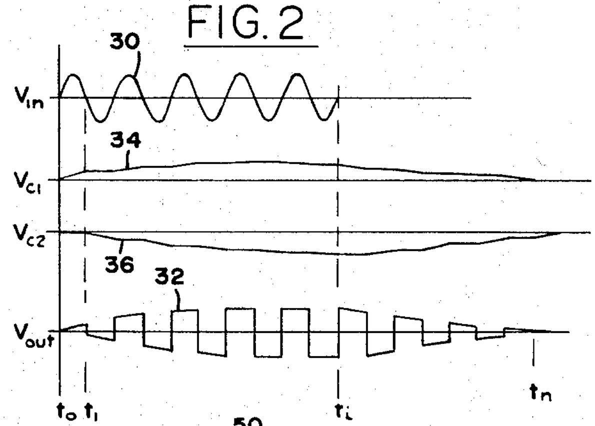
FIG. 2 shows the waveforms of various voltages encountered in the circuit of FIG. 1.

The operation of the filter circuit of FIG. 1 can be appreciated by considering its response to a sinusoidal input signal at 10 which starts suddenly, and which stops suddenly after a few cycles. It is assumed that the input at 10 is of the same frequency $f_1$ as the frequency of operation of the switch 26 and is in phase with the operation of the switch. The voltage waveforms for various parts of the circuit of FIG. 1 are shown in FIG. 2. The input voltage is shown at 30, the output is shown at 32, the voltage across capacitor $C_1$ is shown at 34, and the voltage across capacitor $C_2$ is shown at 36.

In the waveforms of FIG. 2, it is assumed that a first cycle of the input voltage 30 begins at the time $t_0$. At this time, the switch 26 connects the first capacitor $C_1$ to ground, thereby allowing an increase in the voltage across it. While the capacitor $C_1$ is connected to ground, its voltage also appears at the output 12. During the next half cycle, beginning at $t_1$, the switch connects the second capacitor $C_2$ to ground, and $C_2$ acquires a negative voltage, which also appears on the output 12. On succeeding half cycles, the voltages across the capacitors rise until they reach the average voltage during a half cycle of the input. Upon removal of the input voltage at $t_i$, the capacitors are alternately discharged exponentially towards zero through the input resistance 14. After several output cycles without any voltage at the input terminal, a time $t_n$ is reached, after which a negligible output is observed. The time constant of the output envelope is a function of the resistance and capacitance values.

The output voltage 32 is in the nature of a square wave with negligible components of a frequency other than the fundamental frequency and its odd harmonics. Components of a frequency only slightly different than the fundamental frequency do not appear at the output. Thus, if the output signal 32 is passed through a broadband or low pass additional filter of even moderately sharp cutoff above the frequency $f_1$ (to eliminate odd harmonics) an almost pure sinusoidal output will be obtained. This output of the additional filter will equal the component at the input 10 of the frequency $f_1$.

Figure 3:
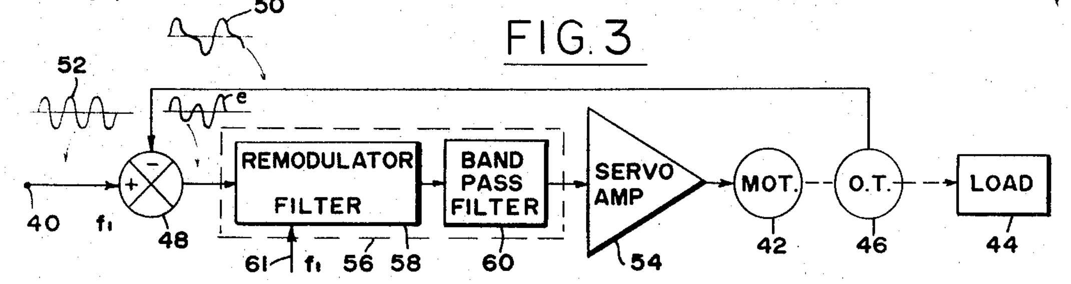
FIG. 3 is a block diagram of a servo system employing the filtering apparatus of the present invention.

FIG. 3 illustrates one application of the filter circuit of FIG. 1. This is as a phase or waveform restorer in an alternating current servomechanism system. FIG. 3 is a block diagram of a typical servomechanism which includes an input terminal 40 whose input signal 52, after processing, energizes a motor 42 that drives a load 44. An output transducer 46 connected to the motor shaft generates a signal 50 which is delivered to a summing junction 48. The summing junction substracts the transducer signal 50 from the input signal 52 and delivers a difference signal *e*. This difference signal must be amplified by a servoamplifier 54 to drive the motor. As the motor is driven, the transducer output 50 increases. This results in a decrease in the output from the summing circuit 48, thereby decreasing the input to the motor.

The carrier frequency used for the input signal 52 is the same as the frequency of the excitation signals for the transducer 46, e.g., the signals that energize the field coils of a synchro generator transducer. Accordingly, the fundamental frequencies of all inputs to the summing circuit 48 are the same. However, due to phase shifts and waveform distortions in the transducer 46, its output 50 may differ in phase from the input at 40 and may also contain harmonic components, particularly the first harmonic. (Even if the input 40 contains harmonic components, distortion will result in a different proportion of harmonic content in the transducer output 50.) When subtracted by the summing circuit 48, the fundamental in-phase content at the output of the summing circuit 48 may be zero, but a large quadrature and harmonic signal will remain that overloads the servoamplifier 54 and causes excessive heating of the motor.

A filter system 56, which includes a remodulator filter 58 whose output is passed through a bandpass filter 60 is used to filter the output of the summing circuit. This filter system extracts the fundamental in-phase component of signals and provides a controlled phase and waveform to the servoamplifier 54. The switch of the remodulator filter 58 is driven by a signal $f_1$ at switch input 61, which is at the same frequency and phase as the signal 52 at the circuit input 40. The bandpass filter 60 can be of a moderate bandwidth which can prevent the passage of the third and higher harmonics of the filtering frequency. A simple LC circuit can be used for this purpose. It should be noted that, since the remodulator filter operates by filtering the information content of the input signal, a lag in response is produced which must be considered in the design of the servomechanism loop.

Figure 4:
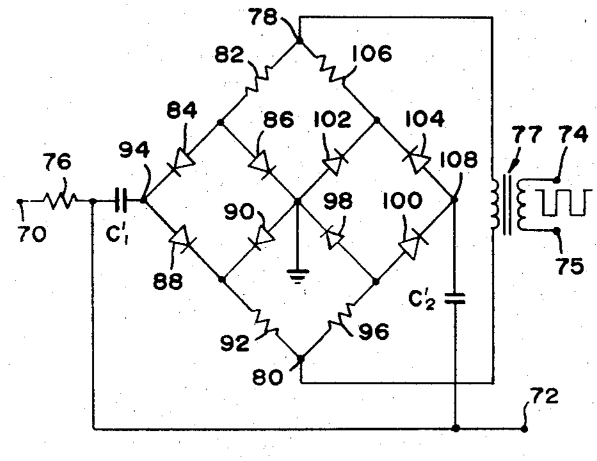
FIG. 4 is a more complete circuit diagram of the circuit of FIG. 1.

FIG. 4 shows an embodiment of a remodulator filter circuit of the type shown in FIG. 1. The input waveform to be filtered is received at input terminal 70, while the output is delivered at output terminal 72. The switch input which governs the frequency and phase of filtering is received at the control inputs 74 and 75 and passed through a transformer 77. The switch signal may be a square wave, whose fundamental frequency is the center of the passband, and whose instants of voltage change represent the zero crossings of the signals having a phase which will allow them to pass through the filtering circuit without reduction.

Input signals to be filtered, which are received at 70, pass through a resistance 76 corresponding to the resistance 14 in FIG. 1. These signals are processed by capacitors $C_1'$ and $C_2'$ corresponding to the capacitors $C_1$ and $C_2$ of FIG. 1. The eight diode arrangement serves the function of the switch 26 of FIG. 1. When the input at 74 is positive with respect to terminal 75, so that the terminal 78 is positive while the terminal 80 is negative, currents flow through resistor 82, the four diodes 84, 86, 88, and 90, and resistor 92. The terminal 94 is then essentially grounded, so that capacitor $C_1'$ begins to charge. When the input at 74 becomes negative, the terminal 80 is positive while terminal 78 is negative, and currents flow through resistor 96, diodes 98, 100, 102, 104 and resistor 106. Junction 108 is then essentially grounded so capacitor $C_2'$ is charged by the input. Thus, the apparatus operates in the same manner as the switch 26 illustrated diagramatically in FIG. 1. A variety of other switching arrangements can, of course, be used instead of the diode arrangement of FIG. 4.

Figure 5:
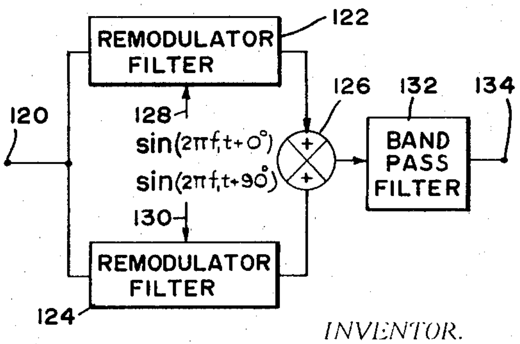
FIG. 5 is a block diagram of a circuit for enabling filtering when the phase of the input components or center filter frequency is unknown.

FIG. 5 illustrates an application of the invention for filtering an input signal of unknown phase by the use of two remodulator filters of the type shown in FIG. 1. The apparatus of FIG. 5 comprises an input terminal 120 for receiving signals to be filtered, a pair of remodulator filters 122 and 124, and an adder circuit 126 for adding the outputs of the two remodulator filters. Each remodulator filter is of the type shown in FIG. 1, and both have a switch driven at a frequency $f_1$ which is the only frequency to be passed through the filter.

While both remodulator switches are driven at the same frequency, the switches are operated 90° out of phase with each other. Thus, the switch input 128 to the first remodulator filter may be defined by $\sin(2\pi f_1 t+0°)$, while the switch input 130 to the second remodulator filter may be defined by the function $\sin(2\pi f_1 t+90°)$. In practice, square waves are often used, and the foregoing sine waves would be the fundamental components of such square waves.

The outputs from the two remodulator filters are added together in the adder circuit 126. The output of the adder circuit is proportional to the component of frequency $f_1$ at the input 120, regardless of the phase of that component. For example, the $f_1$ component at the circuit input 120 may be greatly out of phase with the switching of the first remodulator filter 122. However, the resulting decrease in output from the first remodulator filter 122 is made up by the increase in output from the second remodulator filter 124. The sum of the outputs of the two filters, which are switched 90° out of phase with each other, is always proportional to the input at 120. The output from the adder circuit 126 is in the nature of a square wave of the type shown at 32 in FIG. 2, and can be passed through a broad passband filter 132 which eliminates third and higher harmonics before reaching the output terminal 134.

Figure 6:
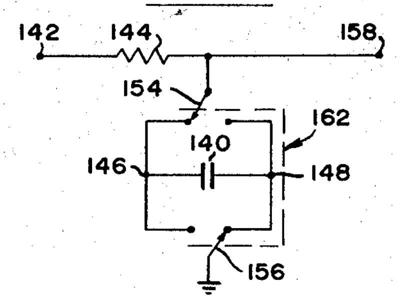
FIG. 6 is a simplified circuit diagram of filtering apparatus constructed in accordance with another embodiment of the invention which utilizes only one capacitor.
Figure 7:
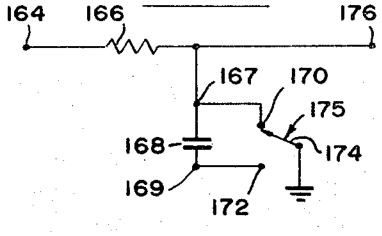
FIG. 7 is a simplified circuit diagram of filtering apparatus constructed in accordance with still another embodiment of the invention which utilizes only one capacitor.

The manner of filtering by synchronously charging a capacitor during half cycles of the center frequency can be accomplished in a number of different ways. FIGS. 6 and 7 illustrate filtering apparatus utilizing only one capacitor.

In FIG. 6, a capacitor 140 is utilized which has two terminals 146 and 148. The two terminals are alternately connected to two switch arms 154 and 156 of a double-pole-double-throw switch 162. The input 142 to the circuit is connected through a resistor 144 to the switch arm 154, while the other switch arm 156 is connected to ground. The switch 162 is driven at the center passband frequency $f_1$. Thus, capacitor terminals 146 and 148 are alternately connected to the output 158 and to ground at every half-cycle. The output of the circuit of FIG. 6 is similar to the output of the circuit of FIG. 1.

FIG. 7 illustrates a half-wave filtering apparatus utilizing one capacitor 168. The capacitor has two terminals 167 and 169 which are connected to two contacts 170 and 172 of a single-pole-double-throw switch 175. The capacitor terminal 167 is also connected directly to the circuit output 176, and through a resistor 166 to the circuit input 164. The arm 174 of the switch has one side connected to ground, while the other side alternates at a center passband frequency $f_1$ between the two contacts 170 and 172. The output of the circuit of FIG. 7 is zero (ground) at alternate half cycles, and is the same as the circuit of FIG.1 during the other half cycles.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. Bandpass filtering apparatus responsive to an input signal for passing signal components of a selected frequency, comprising:

first capacitance means;

first charging means for repeatedly charging said first capacitance means towards the level of said input signal during periods spaced at said selected frequency;

first output means coupled to said first capacitance means for carrying a signal proportional to the voltage across said first capacitance means;

second capacitance means;

second means for repeatedly charging said second capacitance means towards said input signal during periods spaced at said selected frequency, but phase delayed by 90° of said frequency with respect to the periods of said first charging means;

second output terminal means coupled to said second capacitance means for carrying a signal proportional to the voltage across said second capacitance means; and adder means coupled to said first output means and second output terminal means for generating a signal proportional to their sum.

2. Filtering apparatus as defined in claim 1 including: additional filter means coupled to said output means for filtering out only signals of a frequency approximately equal to and greater than the third harmonic of said selected frequency.

References Cited

UNITED STATES PATENTS

| | | | |
|---|---|---|---|
| 2,891,174 | 6/1959 | Hawkins | 307—295X |
| 2,965,823 | 12/1960 | Wolman | 307—257X |
| 3,072,854 | 1/1963 | Case, Jr. | 328—127X |
| 3,090,017 | 5/1963 | Novic | 307—237X |
| 3,317,756 | 5/1967 | Laporte | 307—229 |
| 3,421,020 | 1/1969 | Ringelhaan | 307—229X |
| 3,436,684 | 4/1969 | Mack | 307—257X |
| 3,436,685 | 4/1969 | Mack | 307—257X |

STANLEY T. KRAWCZEWICZ, Primary Examiner

U.S. Cl. X.R.

307—233, 240, 246, 257, 317; 328—127, 138; 329—50